United States Patent
Stallings et al.

(10) Patent No.: US 8,504,935 B2
(45) Date of Patent: Aug. 6, 2013

(54) QUICK-ACCESS MENU FOR MOBILE DEVICE

(75) Inventors: Heath Stallings, Colleyville, TX (US);
Brian F. Roberts, Dallas, TX (US);
Donald H. Relyea, Jr., Dallas, TX (US);
George Masao Higa, Dallas, TX (US);
Sok Y. Hwang, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 584 days.

(21) Appl. No.: 12/341,381

(22) Filed: Dec. 22, 2008

(65) Prior Publication Data

US 2010/0162108 A1 Jun. 24, 2010

(51) Int. Cl.
*G06F 3/01* (2006.01)
*G06F 3/048* (2006.01)

(52) U.S. Cl.
USPC ............................................. 715/778

(58) Field of Classification Search
USPC ................. 715/773, 702, 864, 778
See application file for complete search history.

(56) References Cited

U.S. PATENT DOCUMENTS

| | | | |
|---|---|---|---|
| 7,487,467 B1 * | 2/2009 | Kawahara et al. | 715/810 |
| 7,954,064 B2 * | 5/2011 | Forstall et al. | 715/779 |
| 8,335,993 B1 * | 12/2012 | Tan | 715/773 |
| 2003/0189597 A1 * | 10/2003 | Anderson et al. | 345/778 |
| 2003/0197736 A1 * | 10/2003 | Murphy | 345/780 |
| 2007/0250794 A1 * | 10/2007 | Miura et al. | 715/810 |
| 2008/0059913 A1 * | 3/2008 | Burtner et al. | 715/854 |
| 2009/0204925 A1 * | 8/2009 | Bhat et al. | 715/778 |

* cited by examiner

*Primary Examiner* — Omar Abdul-Ali
*Assistant Examiner* — Haimei Jiang

(57) ABSTRACT

A computing device displays a multi-button menu icon and a group of application icons associated with one of the buttons of the multi-button menu icon. User input is received to activate the multi-button menu icon and to identify a first button of the multi-button menu icon associated with a location of the user input. A group of application icons, associated with the identified first button of the multi-button menu icon, is displayed. A second button of the multi-button menu icon is identified based on a changed location of the user input, and a different group of application icons associated with the identified second button are displayed. The multi-button menu icon is deactivated upon removal of the user input, allowing one of the application icons to be selected with a second user input.

22 Claims, 11 Drawing Sheets

QUICK-ACCESS MENU FOR MOBILE DEVICE

BACKGROUND

Mobile devices (e.g., cell phones, personal digital assistants (PDAs), etc.) are being configured to support an increasing amount and variety of applications. For example, a mobile device may include telephone applications, organizers, email applications, instant messaging (IM) applications, games, cameras, image viewers, etc. Users typically may launch an application by selecting an icon (or shortcut) to activate the application. Despite the large number of options, users still desire to find and select a desired icon quickly. However, the available display size may limit the number of icons that can be effectively presented due to the size of the device containing the display. Existing user interfaces may provide one of a variety of menu formats that group menu items into categories and sub-categories. These user interfaces may require a user to "drill down" through multiple menus to select a desired icon or other item.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide a quick-access menu system for a mobile device (e.g., a cell phone, a PDA, a personal computer, a laptop computer, a remote control, etc.). In one implementation, the quick-access menu arrangement may include a multi-button menu icon. Each button of the multi-button menu icon may be associated with a unique group of application icons that can be displayed around the multi-button menu icon on a screen of the mobile device. User input, such as a touch on a touch-sensitive screen, may be applied to the multi-button menu icon to activate the quick-access menu system. The user input may move over the different buttons in the multi-button menu icon and the mobile device may interchangeably display groups of application icons based on the button currently associated with the user input.

The term "application icon," as used herein, may refer to any image presented on a screen of a device that, when selected by a user, provides access to a specific file, directory, window, option, program, or application. Each application icon may be associated with executable applications capable of being executed by the mobile device.

Figure 1:
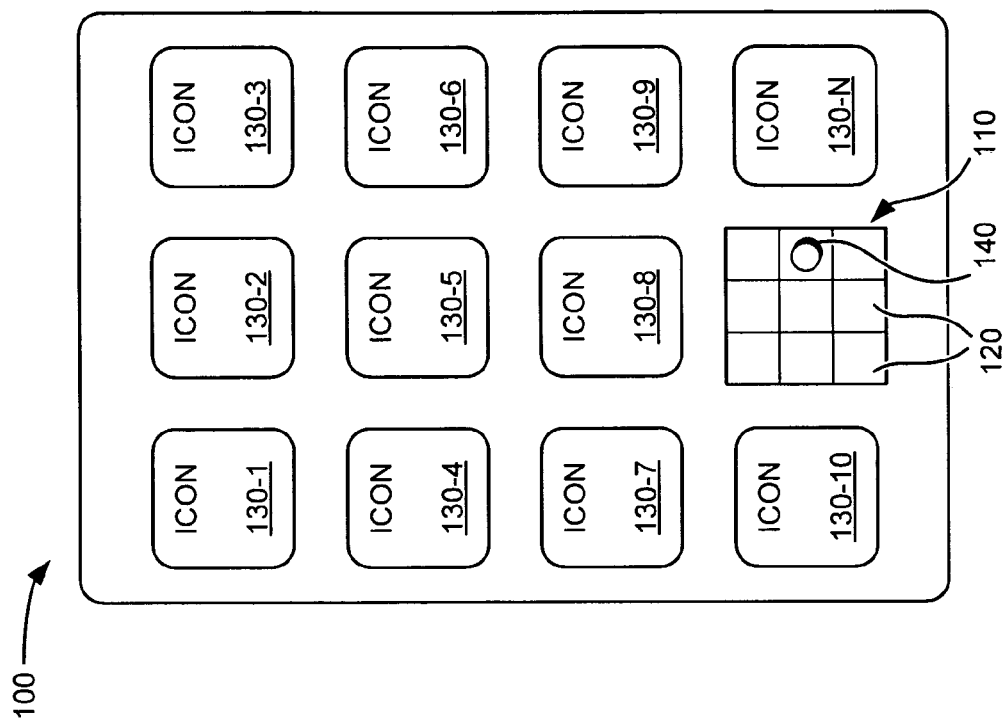
FIG. 1 is a diagram illustrating an exemplary implementation of the concepts described herein.

FIG. 1 provides a diagram illustrating an exemplary implementation of a quick-access menu arrangement 100. Quick-access menu arrangement 100 may include a multi-button menu icon 110 that includes multiple quick-access buttons 120 (referred to herein collectively as "quick-access buttons 120," and individually as "quick-access button 120"). Each of quick-access buttons 120 may be associated with a group of application icons 130-1 through 130-N (referred to herein collectively as "application icons 130," and individually as "application icon 130"). An indicator 140 may identify to a user the particular quick-access button that is currently selected.

In implementations described herein, the user may activate the multi-button menu icon 110, select a quick-access button 120 that will automatically display a group of application icons 130, and then select an application icon 130 from the displayed group of application icons 130. In the exemplary implementation of a touch-sensitive interface, a user may select multi-button menu icon 110 with a touch (e.g., the touch of a finger, stylus, etc.) and then slide the touch over the various quick-access buttons 120 to switch the viewable group of application icons 130. Removal of the user's touch from the multi-button menu icon 110 may deactivate multi-button menu icon 110 and allow the user to select (e.g., with another touch) an application icon 130 from the currently displayed group of application icons 130.

In an exemplary implementation, as shown in FIG. 1, quick-access menu arrangement 100 may include a multi-button menu icon 110 having nine quick-access buttons 120 in a three-by-three arrangement. For each quick-access button 120, quick-access menu arrangement 100 may display eleven application icons 130. Thus, in the configuration of FIG. 1, ninety-nine application icons 130 may be made available to the user with as few as two user-input commands (e.g., two touches).

Although FIG. 1 shows an exemplary quick-access menu arrangement 100, in other implementations, quick-access menu arrangement 100 may contain fewer, different, differently arranged, or additional icons than depicted in FIG. 1. For example, multi-button menu icon 110 may include a different number and/or arrangement of quick-access buttons 120. Also, quick-access menu arrangement 100 may include a different number and/or arrangement of application icons 130 associated with each quick-access button 120. Furthermore, multi-button menu icon 110 may be positioned in a different location within quick-access menu arrangement 100, such as, for example, a location selected by a user.

Figure 2:
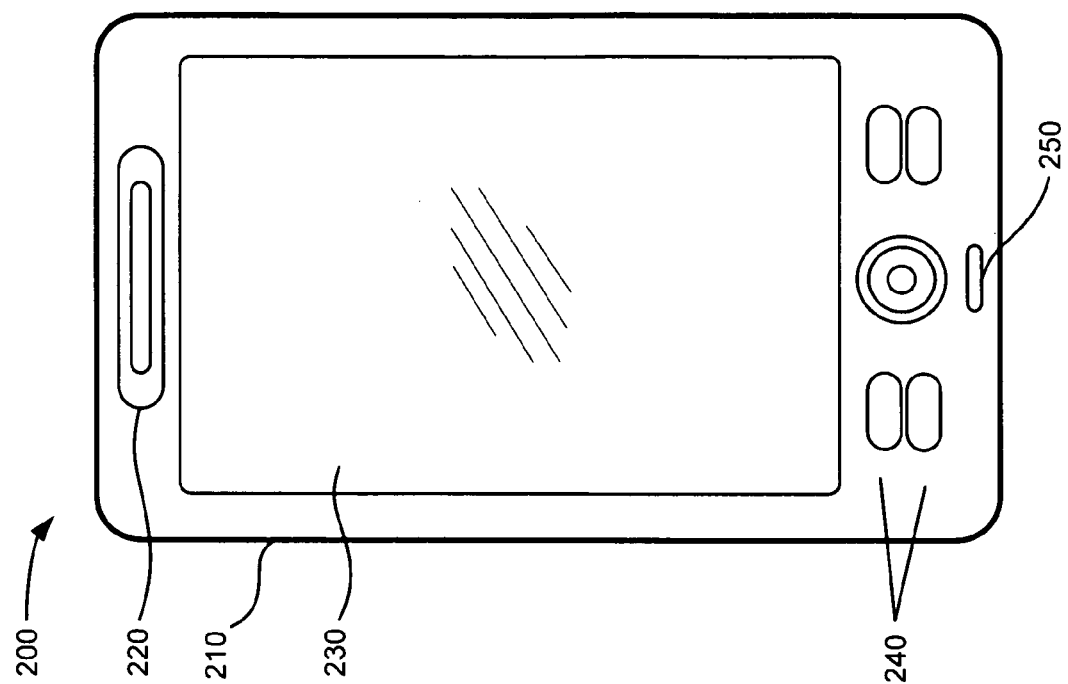
FIG. 2 depicts a diagram of an exemplary device in which systems and/or methods described herein may be implemented.

FIG. 2 is a diagram of an exemplary device 200 in which systems and/or methods described herein may be implemented. Device 200 may include radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a remote control (e.g., for a television), a portable gaming system, a global positioning system (GPS) device, a printer, a facsimile machine, a pager, a camera (e.g., a contemporary camera or a digital camera), a video camera (e.g., a camcorder), a calculator, binoculars, a telescope, a personal computer, a laptop computer, any other device capable of utilizing a touch screen display, a thread or process running on one of these devices, and/or an object executed by one of these devices.

As illustrated in FIG. 2, device 200 may include a housing 210, a speaker 220, a display 230, control buttons 240, and/or a microphone 250. Housing 210 may protect the components of device 200 from outside elements. Housing 210 may include a structure configured to hold devices and components used in device 200, and may be formed from a variety of materials. For example, housing 210 may be formed from plastic, metal, or a composite, and may be configured to support speaker 220, display 230, control buttons 240 and/or microphone 250.

Speaker 220 may provide audible information to a user of device 200. Speaker 220 may be located in an upper portion of device 200, and may function as an ear piece when a user is engaged in a communication session using device 200. Speaker 220 may also function as an output device for music and/or audio information associated with games and/or video images played on device 200.

Display 230 may provide visual information to the user. For example, display 230 may display text input into device 100, text, images, video, and/or graphics received from another device, and/or information regarding incoming or outgoing calls or text messages, emails, media, games, phone books, address books, the current time, etc. For example, screen 310 may include a liquid crystal display (LCD), such as a thin film transistor (TFT) LCD, etc.

In one implementation, display 230 may include a touch screen display that may be configured to receive a user input when the user touches (or comes in close proximity to) display 230. For example, the user may provide an input to display 230 directly, such as via the user's finger, or via other devices, such as a stylus. User inputs received via display 230 may be processed by components and/or devices operating in device 200. The touch-screen-enabled display 230 may permit the user to interact with device 200 in order to cause device 200 to perform one or more operations. Exemplary technologies to implement a touch screen on display 230 may include, for example, a near-field-sensitive (e.g., capacitive) overlay, an acoustically-sensitive (e.g., surface acoustic wave) overlay, a photo-sensitive (e.g., infra-red) overlay, a pressure sensitive (e.g., resistive and/or capacitive) overlay, and/or any other type of touch panel overlay that allows display 230 to be used as an input device. The touch-screen-enabled display 230 may also include the ability to identify movement of a body part or a pointing device as it moves on or near the surface of the touch-screen-enabled display 230.

Control buttons 240 may permit the user to interact with device 200 to cause device 200 to perform one or more operations. For example, control buttons 240 may be used to cause device 200 to transmit information. Microphone 250 may receive audible information from the user. For example, microphone 250 may receive audio signals from the user and may output electrical signals corresponding to the received audio signals.

Although FIG. 2 shows exemplary components of device 200, in other implementations, device 200 may contain fewer, different, differently arranged, or additional components than depicted in FIG. 2. For example, in some implementations device 200 may include a keypad, such as a standard telephone keypad, a QWERTY-like keypad (e.g., a traditional configuration of typewriter or computer keyboard keys), or another keypad layout. In still other implementations, a component of device 200 may perform one or more tasks described as being performed by another component of user device 200.

Figure 3:
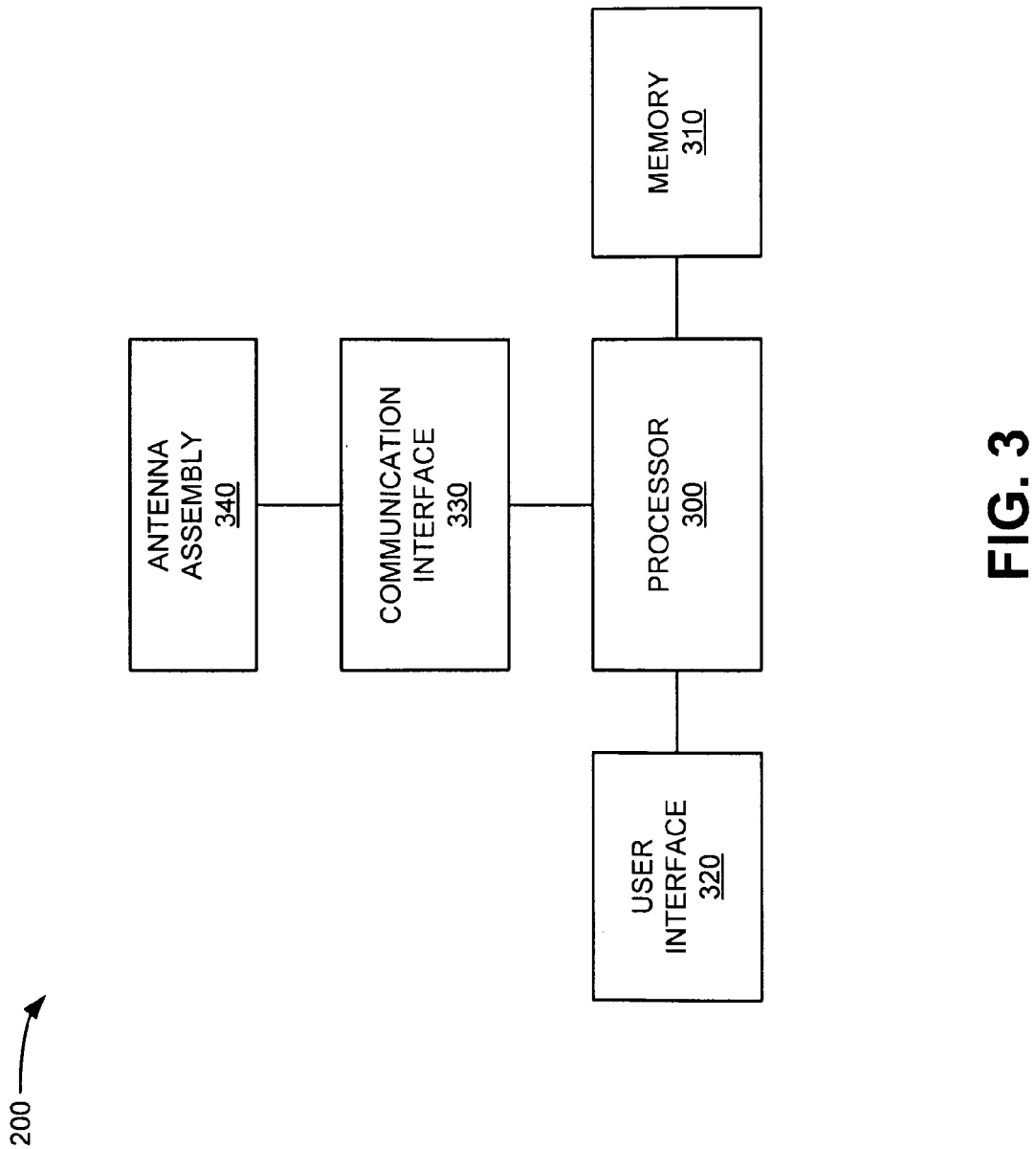
FIG. 3 depicts a diagram of exemplary components of the device illustrated in FIG. 2.

FIG. 3 is a diagram of exemplary components of device 200. As illustrated, device 200 may include a processor 300, a memory 310, a user interface 320, a communication interface 330, and/or an antenna assembly 340.

Processor 300 may include one or more microprocessors, application specific integrated circuits (ASICs), field programmable gate arrays (FPGAs), or the like. Processor 300 may control operation of device 200 and its components. In one implementation, processor 300 may control operation of components of device 200 in a manner described herein.

Memory 310 may include a random access memory (RAM), a read-only memory (ROM), and/or another type of memory to store data and instructions that may be used by processor 300. In one implementation, memory 310 may store data used to display a graphical user interface, such as quick-access menu arrangement 100 on display 230.

User interface 320 may include mechanisms for inputting information to device 200 and/or for outputting information from device 200. Examples of input and output mechanisms might include buttons (e.g., control buttons 240, keys of a keypad, a joystick, etc.); a speaker (e.g., speaker 220) to receive electrical signals and output audio signals; a microphone (e.g., microphone 250) to receive audio signals and output electrical signals; a display (e.g., display 230) to receive touch input and/or to output visual information (e.g., time-related items received by device 200); a vibrator to cause device 200 to vibrate; and/or a camera to receive video and/or images.

Communication interface 330 may include, for example, a transmitter that may convert baseband signals from processor 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network.

As will be described in detail below, device 200 may perform certain operations described herein in response to processor 300 executing software instructions of an application contained in a computer-readable medium, such as memory 310. A computer-readable medium may be defined as a physical or logical memory device. A logical memory device may include a space within a single physical memory device or spread across multiple physical memory devices. The software instructions may be read into memory 310 from another computer-readable medium or from another device via communication interface 330. The software instructions contained in memory 310 may cause processor 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 200, in other implementations, device 200 may contain fewer, different, differently arranged, or additional components than depicted in FIG. 3. In still other implementations, a component of device 200 may perform one or more other tasks described as being performed by another component of device 200.

Figure 4:
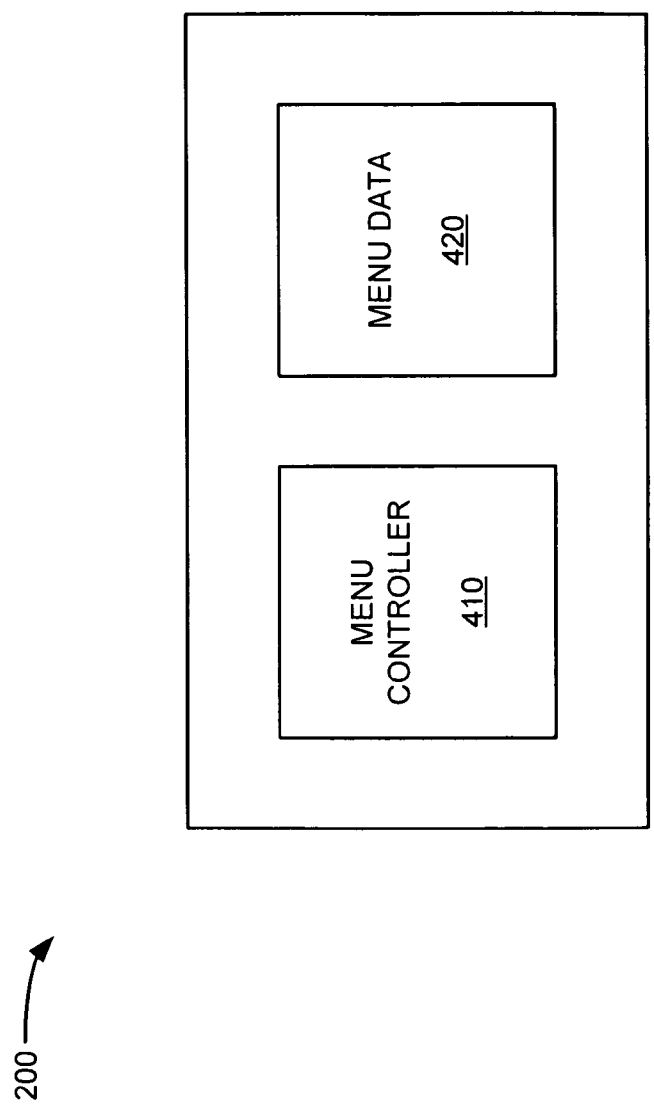
FIG. 4 depicts a diagram of exemplary functional components of the device illustrated in FIG. 2.

FIG. 4 provides a diagram of exemplary functional components of device 200. As shown in FIG. 4, device 200 may include a menu controller 410 and menu data 420. Device 200 may also include other peripheral applications (not shown) associated with one or more application icons 130. Peripheral applications may include, for example, a telephone application, a text-messaging application, an email application, an instant messaging (IM) application, a calendar application, a multimedia messaging service (MMS) application, a short message service (SMS) application, an image viewing application, a camera application, an organizer, a video player, an audio application, a GPS application, etc.

Menu controller 410 may generate and update a graphical user interface for a quick-access menu arrangement (e.g., quick-access menu arrangement 100). In one implementation, menu controller 410 may assemble application icons 130 based on one or more templates. Templates may include for example, arrangements for groups of application icons 130 associated with each quick-access button 120 of multi-button menu icon 110. For example, menu controller 410 may retrieve, from menu data 420, an application icon 130 representing a peripheral application, apply stored user preferences, and insert the application icons 130 into a graphic template.

Menu controller 410 may receive input to identify what application icons 130 may be assigned to a particular group associated with a quick-access button 120. Menu controller 410 may store group assignments, for example, in menu data 420. Menu controller 410 may also store trigger information to detect when multi-button menu icon 110 is activated/deactivated. Menu controller 410 may also include logic to present multi-button menu icon 110 in an activated or deactivated mode. When multi-button menu icon 110 is in an activated mode, menu controller 410 may track user input to the multi-button menu icon 110 and display a group application icons 130 corresponding to the currently selected quick-access button 120 of multi-button menu icon 110.

Menu data 420 may include information that may be used by menu controller 410 to compile the quick-access menu arrangement. Menu data 420 may include, for example, menu templates, application icons, icon groupings, menu triggers, and/or configurations for the multi-button menu icon, and user preferences. User preferences may include, for example, format preferences for the quick-access menu arrangement, such as font/icon sizes, icon group definitions, group menu titles, the position of multi-button icon 110, and/or transition animations for switching between icon groups (e.g., slide in/out, wipe orientations, scattering, etc.). In some implementations, groups of application icons (e.g., the particular application icons associated with each quick-access button 120) may be entirely user-configurable. In other implementations, the groups of application icons may include a combination of default icons and user-selected icons.

Although FIG. 4 shows exemplary functional components of device 200, in other implementations, device 200 may contain fewer, different, differently arranged, or additional functional components than depicted in FIG. 4. In still other implementations, a functional component of device 200 may perform one or more tasks described as being performed by another functional component of device 200.

Figure 5B:
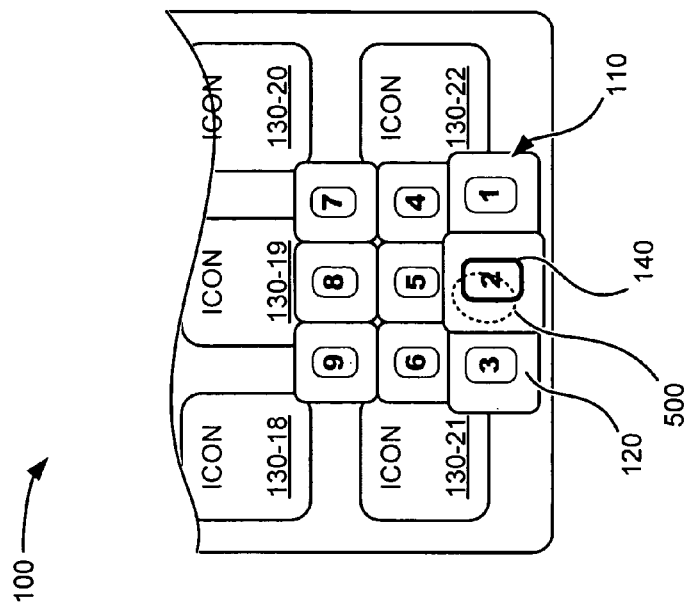
FIGS. 5A and 5B provide examples of a quick-access menu arrangement according to implementations described herein.
Figure 5A:
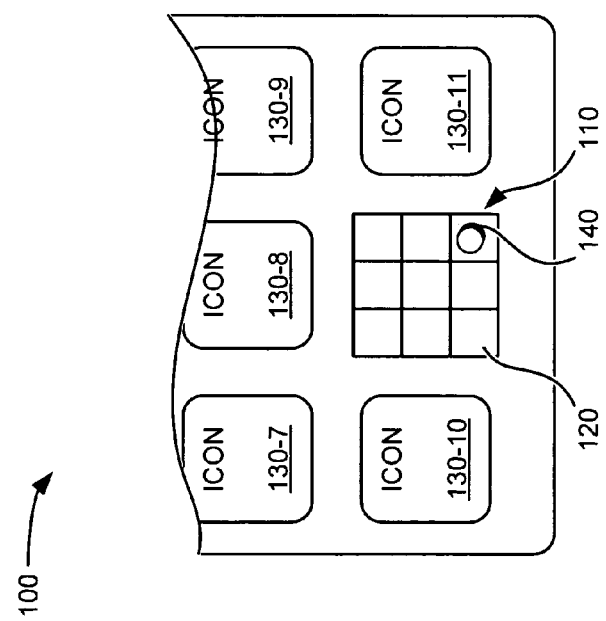

FIGS. 5A and 5B provide examples of quick-access menu arrangement 100 according to implementations described herein. FIG. 5A provides a partial view of quick-access menu arrangement 100 with multi-button menu icon 110 in an inactive state. FIG. 5B provides a partial view of quick-access menu arrangement 100 with multi-button menu icon 110 in an active state.

As shown in FIG. 5A, in an inactive state, multi-button menu icon 110 may be displayed at a comparatively small size (relative to the size of display 230). Indicator 140 may be shown to identify the currently selected quick-access button 120 to which the displayed application icons correspond. Thus, in FIG. 5A, the application icons (e.g., applications 130-7, 130-8, 130-9, 130-10, and 130-11), associated with the quick-access button 120 at the lower-right right of multi-button menu icon 110, are displayed.

In one implementation, as shown in FIG. 5B, a user may activate multi-button menu icon 110 by, for example, a touch 500 on a touch-sensitive display in the area of multi-button menu icon 110. In other implementations, multi-button menu icon 110 may be activated by other mechanisms, such as a touch on a touchpad, a press of a designated control button (e.g., one of control buttons 240), a press on a pressure-sensitive display, and/or a selection using a cursor. As shown in the exemplary implementation of FIG. 5B, activation of multi-button menu icon 110 may cause device 100 to enlarge and/or alter the appearance of multi-button menu icon 110. Additionally and/or alternatively, individual quick-access buttons 120 may be enlarged and/or altered as the user's touch (or cursor) slides over each quick-access button 120. Additionally and/or alternatively, labels or images (e.g., "1," "2," . . . "9") may be displayed on individual quick-access buttons 120. Furthermore, the size and appearance of indicator 140 may also be enlarged and/or altered to indicate the currently selected quick-access button 120. Thus, as shown in FIG. 5B, touch 500 at quick-access button 120 "2" may simultaneously cause the activation of multi-button menu icon 110, the enlargement of multi-button menu icon 110, and the display of the application icons 130 associated with quick-access button 120 "2."

Figure 6A:
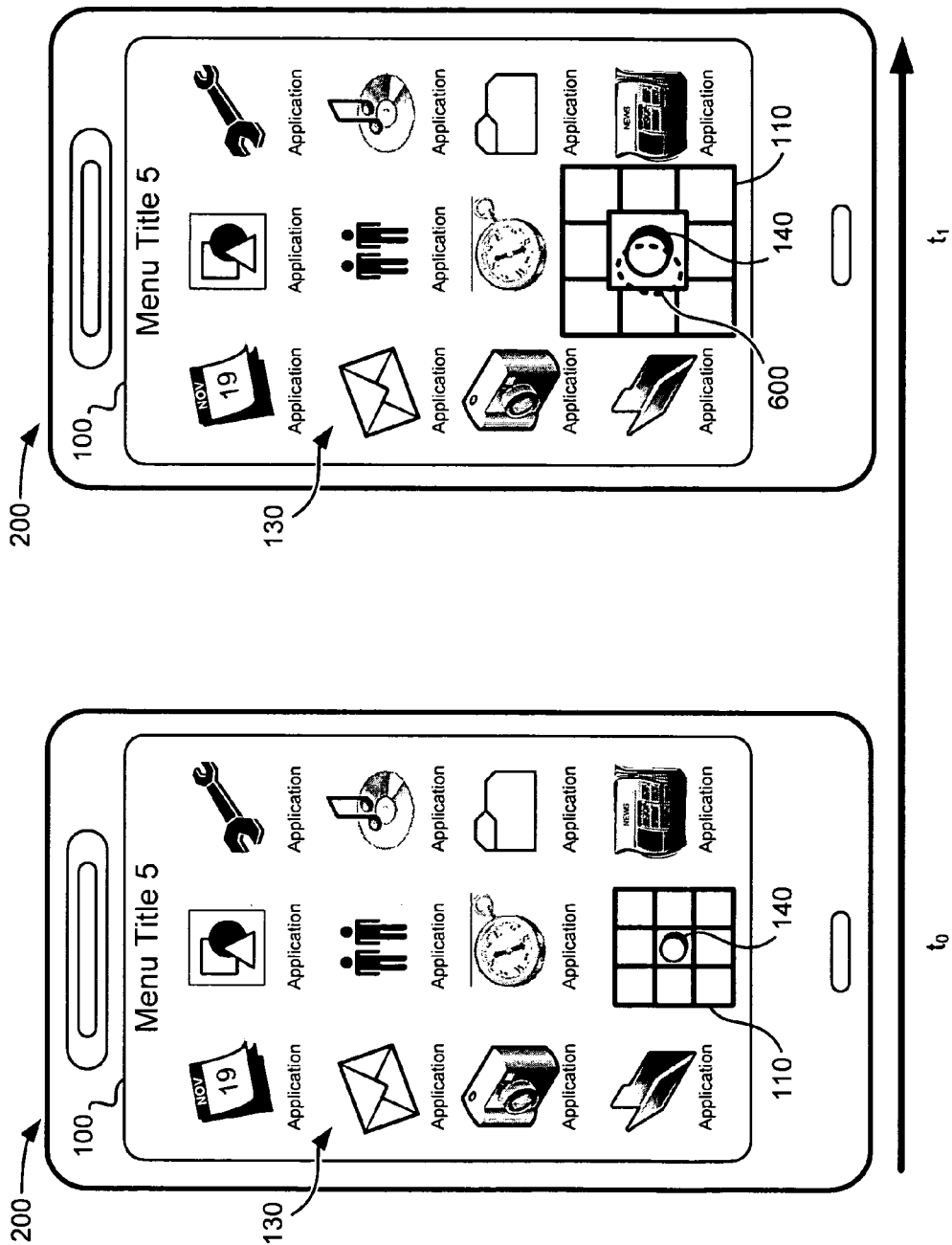
FIGS. 6A and 6B illustrate exemplary menu operations capable of being performed by the device depicted in FIG. 2.
Figure 6B:
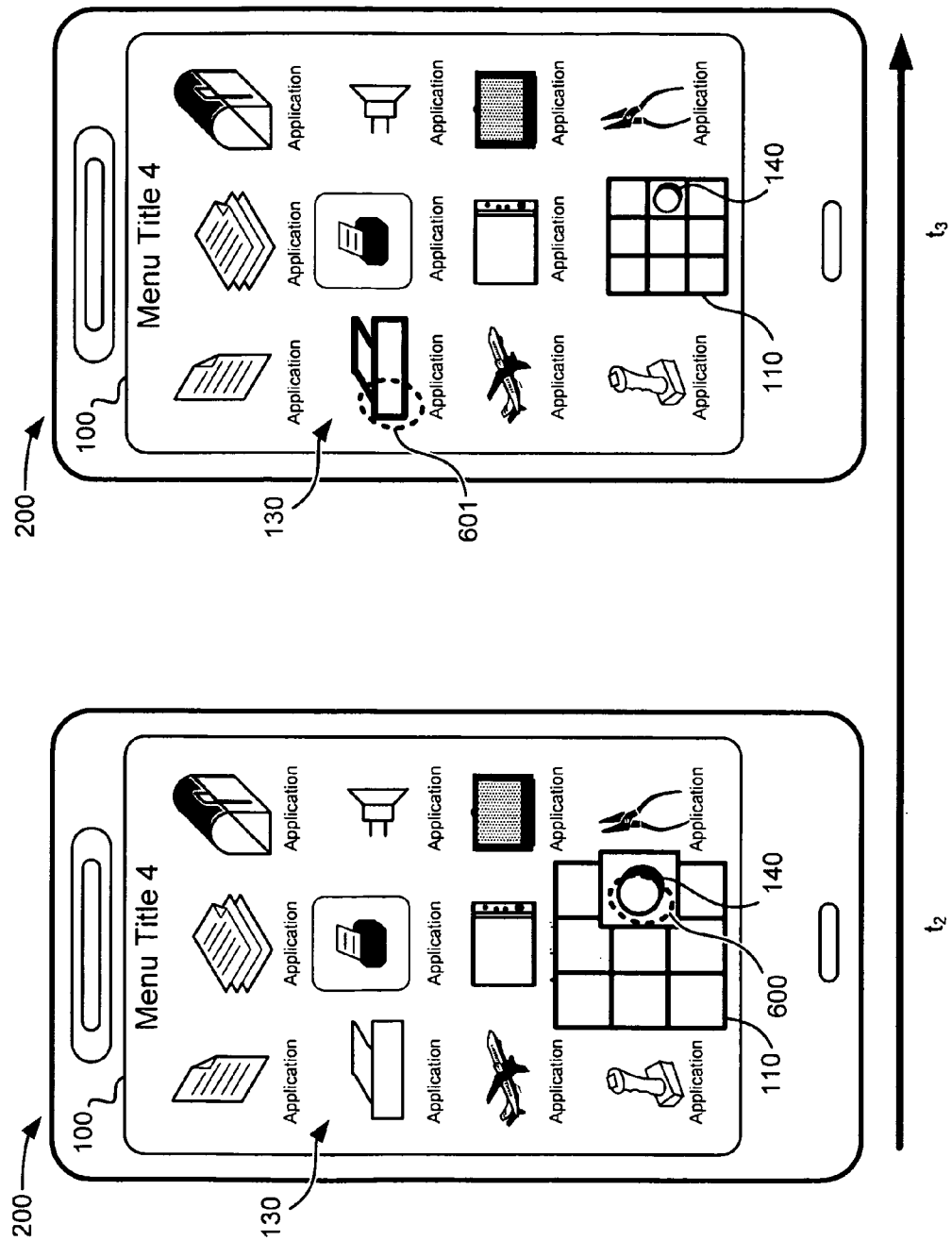

FIGS. 6A and 6B illustrate exemplary menu operations capable of being performed by a device, such as device 200. In FIGS. 6A and 6B, quick-access menu arrangement 100 is shown as a function of time progressing from time $t_0$ to time $t_3$. FIG. 6A provides a view of quick-access menu arrangement 100 times $t_0$ and $t_1$. At time $t_0$, multi-button menu icon 110 may be in an inactive state. Indicator 140 may be shown on the center quick-access button of multi-button menu icon 110 and a group of application icons 130 corresponding to the currently selected quick-access button may be displayed. At time $t_1$, a user may apply a touch 600 generally to the center of multi-button menu icon 110 to activate multi-button menu icon 110. Multi-button menu icon 110 may be enlarged. Because touch 600 is applied generally over the current location of indicator 140, the group of application icons 130 may remain unchanged.

FIG. 6B provides a view of quick-access menu arrangement 100 at times $t_2$ and $t_3$, subsequent to times $t_0$ and $t_1$, of FIG. 6A. At time $t_2$, touch 600 may slide to the right-center of multi-button menu icon 110 while multi-button menu icon 110 remains in an active state. Indicator 140 may be shown on the right-center quick-access button of multi-button menu icon 110 and a different group of application icons 130 corresponding to the currently selected quick-access button may be displayed. At time $t_3$, the user may have removed touch 600 from multi-button menu icon 110, which may deactivate multi-button menu icon 110. Multi-button menu icon 110 may be reduced to the inactive size and indicator 140 may remain displayed on the quick-access button corresponding to the last touch area of the user. In other implementations, multi-button menu icon 110 may be deactivated using another gesture, such as a tap or press on a display 230. A second touch 601 may be applied by the user to select a particular application icon 130 from the group of application icons 130 associated with the currently selected quick-access button.

Figure 7:
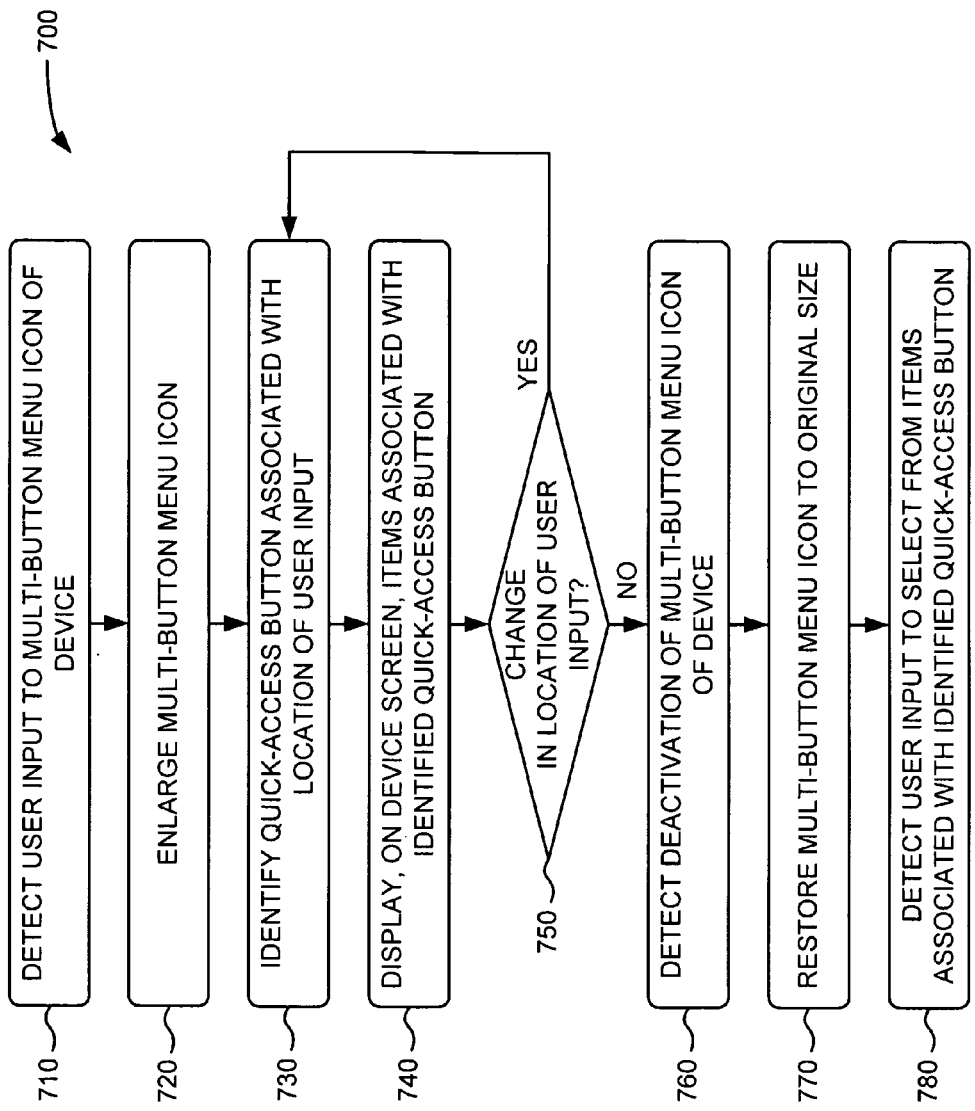
FIG. 7 depicts a flow chart of an exemplary process for providing a quick-access menu according to implementations described herein.

FIG. 7 depicts a flow chart of an exemplary process 700 providing a quick-access menu according to implementations described herein. In one implementation, process 700 may be performed by device 200.

As illustrated in FIG. 7, process 700 may begin with detecting a user input to a multi-button menu icon of the device (block 710) and enlarging the multi-button menu icon (block 720). For example, in one implementation, device 200 (e.g., menu controller 410) may identify touch on a touch-sensitive display that corresponds to the location of a multi-button menu icon (e.g., multi-button menu icon 110). The multi-button menu icon 110 may include, for example, multiple quick-access buttons (e.g., quick-access buttons 120), where each quick-access button can be associated with a group of application icons (e.g. application icons 130). In another exemplary implementation, device 200 may detect user input for the multi-button menu icon via a cursor guided by a mouse, touch panel, or other cursor-based user-input device. In still another exemplary implementation, device 200 may detect user input for the multi-button menu icon from a menu selection or dedicated control button (e.g., one of control buttons 240). In response to the user input, device 200 may enlarge the multi-button menu icon 110. In one implementation, the multi-button menu icon may be sufficiently enlarged, for example, to more easily accommodate a touch on the touch-sensitive display. In other implementations, the multi-button menu icon may be enlarged or otherwise altered to indicate that the multi-button menu icon is in an active state. In some implementations, enlargement of the multi-button menu icon may be optional.

A quick-access button associated with the location of the user input may be identified (block 730). For example, device 200 may identify a particular quick-access button (e.g., one of quick-access buttons 120) associated with the location of the touch on the multi-button menu icon. In another exemplary implementation, device 200 may identify a particular quick-access button associated with the location of the cursor (guided, e.g., by the mouse, touch-panel, or other input device) on the multi-button menu icon. In still another exemplary implementation, device 200 may identify a particular quick-access button based on the direction from a keypad or control button, such as an arrow, trackball, or joystick.

Items associated with the identified quick-access button may be displayed on the device screen (block 740). For example, device 200 may display a group of application icons (e.g. application icons 130) associated with the quick-access button identified based on the touch location, the cursor location, or the control button direction. The group of application icons may be, for example, previously configured groups determined by the user or default groups set by, for example, an original equipment manufacturer (OEM) or software provider.

It may be determined if the location of the user input changes (block 750). For example, device 200 may identify a change in the touch location, the cursor location, or the control button direction while multi-button menu icon 110 remains active. If it is determined that the location of the user input has changed (block 750—YES), then process 700 may return to block 730 to identify a different quick-access button and display a group of application icons associated with the different quick-access button.

If it is determined that the location of the user input has not changed (block 750—NO), deactivation of the multi-button menu icon may be detected (block 760) and the multi-button menu icon may be restored to its original size (block 770). For example, device 200 may eventually detect removal of the user input from the multi-button menu icon. Removal of the user input may include, for example, removal of the touch from the touch sensitive display, release of a mouse-click associated with a cursor, or pressing of a dedicated control button. In response the detected deactivation, device 200 may restore the multi-button menu icon to its original size. In one implementation, the size of the multi-button menu icon may be reduced, for example, to approximately the size of the group of application icons being displayed on the display.

User input to select an item associated with the identified quick-access button may be detected (block 780). For example, device 200 may receive user input (e.g., another touch, a selection via the cursor, or a selection via a keypad and/or control button) to select a particular application icon from the currently displayed group of application icons. The user input to select the particular application icon may trigger launching an application associated with the particular application icon and/or presenting information associated with the particular application icon.

Figure 8:
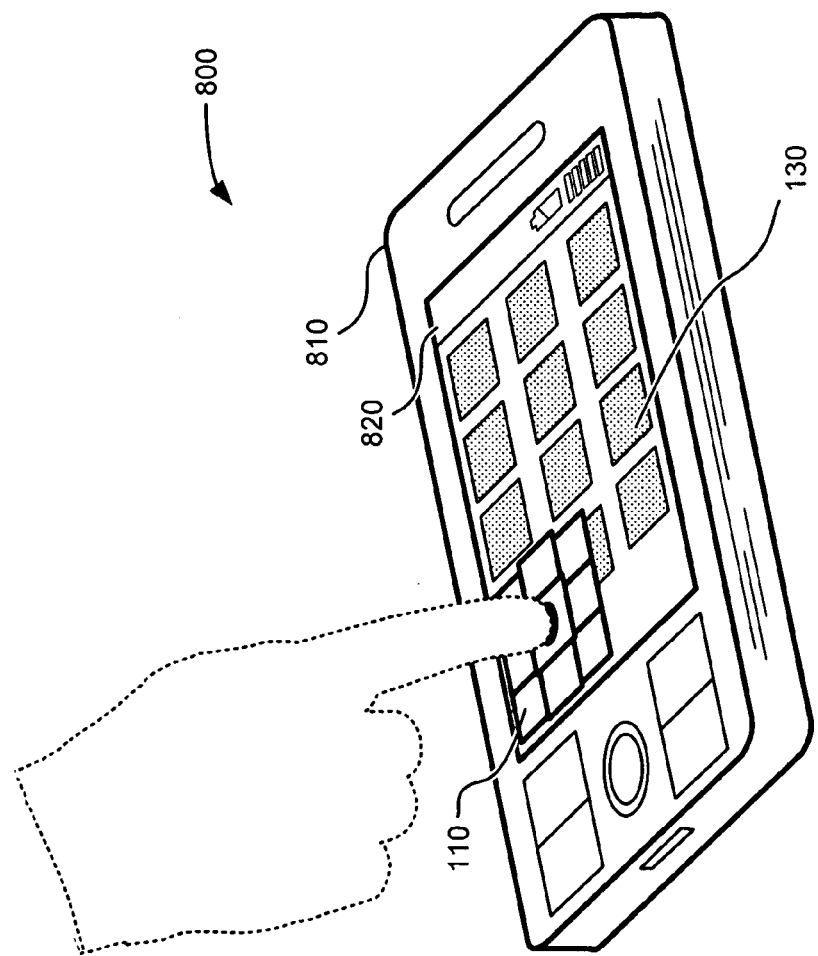
FIG. 8 provides an illustration of an exemplary implementation of a quick-access menu on a mobile device.
Figure 9:
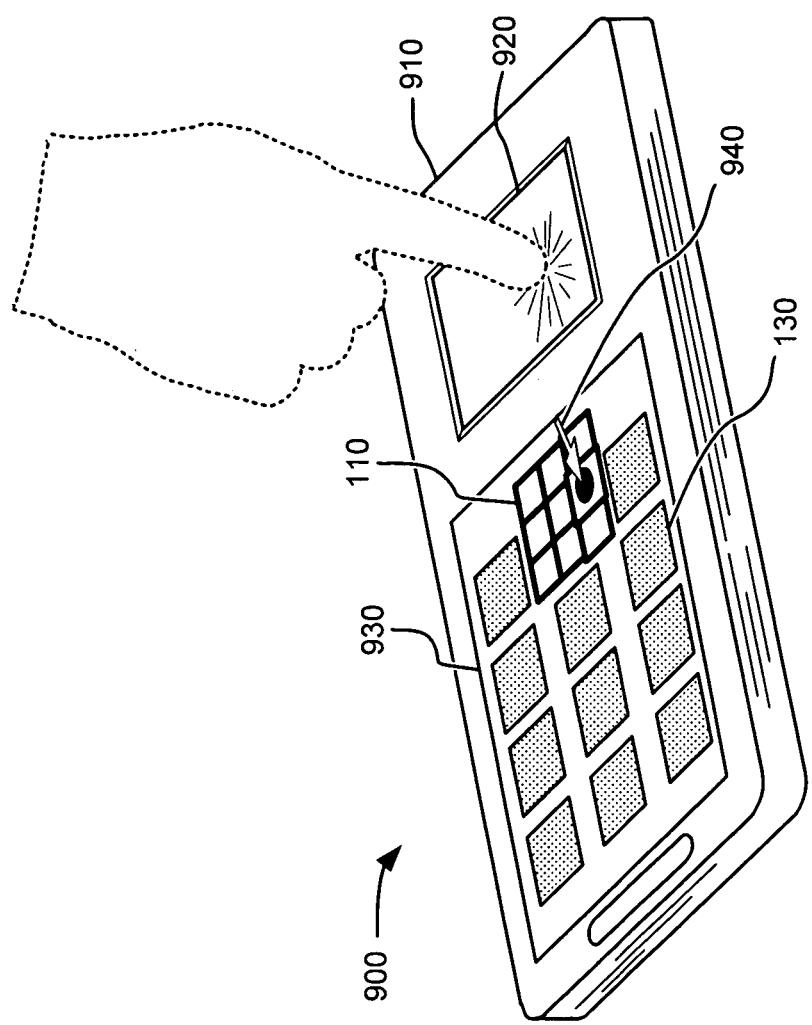
FIG. 9 provides an illustration of another exemplary implementation of a quick-access menu on a mobile device.
Figure 10:
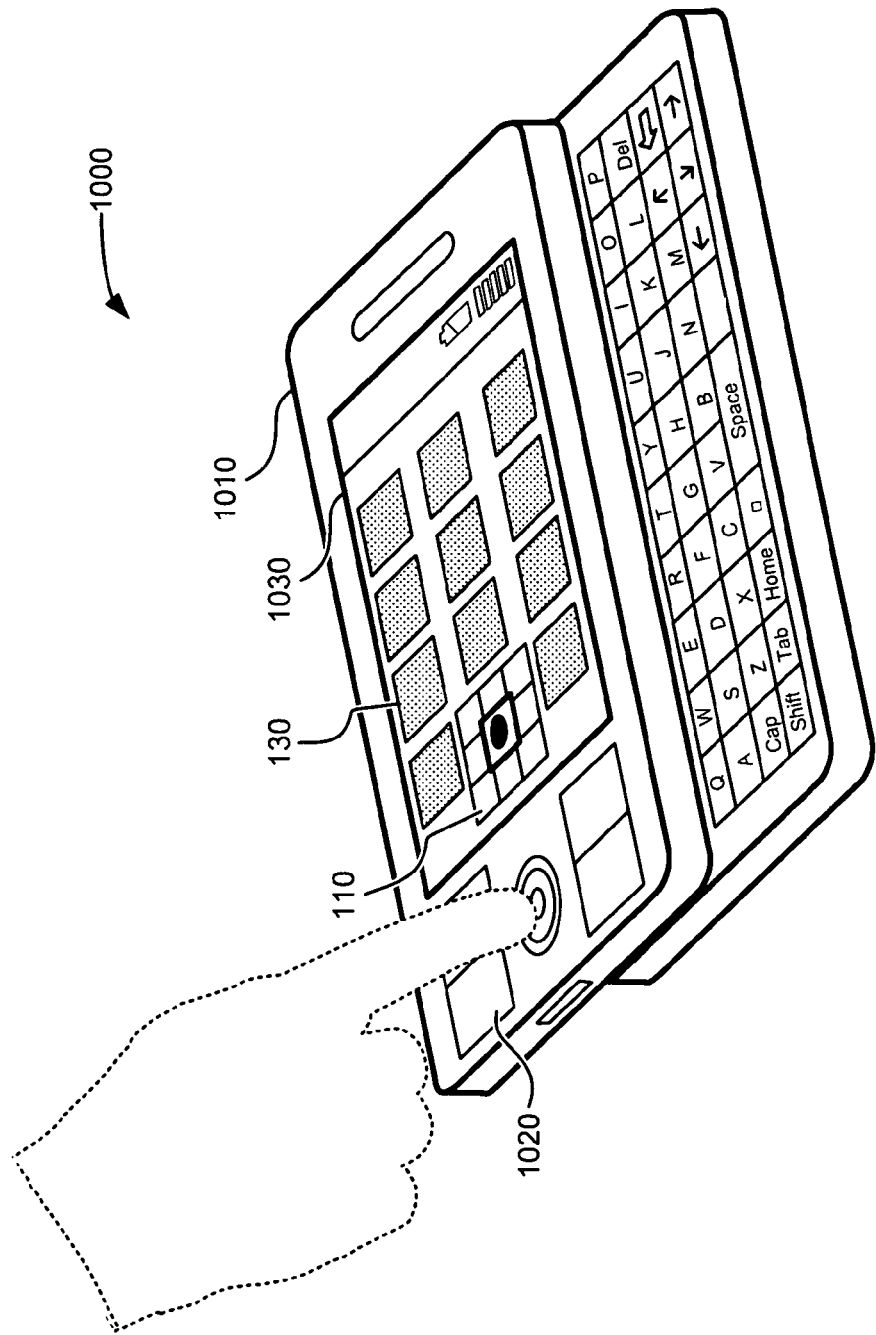
FIG. 10 provides an illustration of still another exemplary implementation of a quick-access menu on a mobile device.

FIGS. 8, 9, and 10 provide illustrations of exemplary user input for a quick-access menu on a variety of devices. FIG. 8 provides an illustration of an exemplary implementation of user input for a quick-access menu on a device 800 with a touch-sensitive display. Referring to FIG. 8, device 800 may include housing 810 and a touch-sensitive display 820. Other components, such as control buttons, a microphone, connectivity ports, memory slots, and/or speakers may be located on device 800, including, for example, on a rear or side panel of housing 810. Although FIG. 8 shows exemplary components of device 800, in other implementations, device 800 may contain fewer, different, differently arranged, or additional components than depicted in FIG. 8.

Touch-sensitive display 820 may include a display screen integrated with a touch-sensitive overlay. In an exemplary implementation, touch-sensitive display 820 may include a capacitive touch overlay. An object having capacitance (e.g., a user's finger) may be placed on or near display 820 to form a capacitance between the object and one or more of the touch sensing points. The touch sensing points may be used to determine touch coordinates (e.g., location) of the touch. The touch coordinates may be associated with a portion of the display screen having corresponding coordinates, including coordinates for a multi-button menu icon. In other implementations, different touch screen technologies may be used.

Touch-sensitive display 820 may include the ability to identify movement of an object as the object moves on the surface of touch-sensitive display 820. As described above with respect to, for example, FIGS. 6A and 6B, device 800 may display on touch-sensitive display 820 a quick-access menu arrangement that accepts user input to a multi-button menu icon (e.g., multi-button menu icon 110). In the implementation shown in FIG. 8, multi-button menu icon 110 may be positioned in a lower corner of display 820 to accommodate, for example, a predominantly left-handed user. In other implementations, multi-button menu icon 110 may be positioned in other locations determined by the user. In the implementation of FIG. 8, the touch on touch-sensitive display 820 may correspond to the activation of multi-button menu icon 110 and simultaneous selection of a quick-access button to display a group of application icons 130. In the implementation shown in FIG. 8, multi-button menu icon 110 may be enlarged upon activation to more easily and/or accurately accept touch input. As shown in FIG. 8, the enlargement of the multi-button menu icon 110 may crowd the presentation of adjacent application icons 130, but not so much as to completely prevent a user's identification of the adjacent application icons 130.

FIG. 9 provides an illustration of an exemplary implementation of user input for a quick-access menu on a device 900 with a touch panel separate from a display. Device 900 may include housing 910, touch panel 920, and display 930. Other components, such as control buttons, a keypad, a microphone, a camera, connectivity ports, memory slots, and/or speakers, may be located on device 900, including, for example, on a rear or side panel of housing 910. Although FIG. 9 shows exemplary components of device 900, in other implementations, device 900 may contain fewer, different, differently arranged, or additional components than depicted in FIG. 9.

FIG. 9 illustrates touch panel 920 being separately located from display 930 on housing 910. Touch panel 920 may include any resistive touch panel technology or other technology providing the ability to register a set of touch coordinates. User input on touch panel 920 may be associated with display 930 by, for example, movement and location of a cursor 940. User input on touch panel 920 may be in the form of the touch of nearly any object, such as a body part (e.g., a finger, as shown) or a pointing device (e.g., a stylus, pen, etc.).

Touch panel 920 may be operatively connected with display 930 to allow the combination of touch panel 920 and display 930 to be used as an input device. Touch panel 920 may include the ability to identify movement of an object as the object moves on the surface of touch panel 920. As described above with respect to, for example, FIGS. 6A and 6B, device 900 may display on display 930 a quick-access menu arrangement 100 that accepts (via touch panel 920) user input to a multi-button menu icon (e.g., multi-button menu icon 110). In the implementation of FIG. 9, the touch on touch panel 920 may correspond to the activation of multi-button menu icon 110 and simultaneous selection of a quick-access button to display a group of application icons 130. Because cursor 940 is used to select a quick-access button, a smaller amount of enlargement of multi-button menu icon 110 upon activation may be used than compared to, for example, a touch screen display. Alternatively, enlargement of multi-button menu icon 110 upon activation be may be the same as that of a touch screen display or enlargement may not be necessary.

FIG. 10 provides an illustration of an exemplary implementation of user input for a quick-access menu on a device 1000 with a set of control buttons a display. Device 1000 may include housing 1010, control buttons 1020, and display 1030. Other components, such as a keypad, a microphone, a camera, connectivity ports, memory slots, and/or speakers, may be located on device 1000, including, for example, on a rear, sliding, or side panel of housing 1010. Although FIG. 10 shows exemplary components of device 1000, in other implementations, device 1000 may contain fewer, different, differently arranged, or additional components than depicted in FIG. 10.

FIG. 10 illustrates control buttons 1020 being separately located from display 1030 on housing 1010. User input on control buttons 1020 may be associated with display 1030 by, for example, toggling between defined user input locations within a quick-access menu arrangement. For example, in one implementation, control buttons 1020 may include a dedicated control button to activate multi-button menu icon 110. Once activated, a user may toggle between quick-access buttons within multi-button menu icon 110 by using, for example, a joystick or direction pad associated with control buttons 1020. A particular application icon may be selected by deactivating multi-button menu icon 110 (e.g., by pressing the dedicated control button) and toggling through the application icons 130 (e.g., by using a joystick or direction pad) to the desired particular application icon 130. Because no touch-sensitive input is used to select a quick-access button, no enlargement of multi-button menu icon 110 upon activation may be needed. Alternatively, activation of multi-button menu icon 110 by a dedicated control button may cause enlargement of multi-button menu icon 110.

Systems and/or methods described herein may display, on a screen of a computing device, a multi-button menu icon and a group of application icons associated with one of the buttons of the multi-button menu icon. User input may be received to activate the multi-button menu icon and to identify a first button of the multi-button menu icon associated with a location of the user input. A group of application icons associated with the identified first button of the multi-button menu icon may be displayed. A second button of the multi-button menu icon may be identified based on a changed location of the user input and a different group of application icons associated with the identified second button may be displayed. The multi-button menu icon may be deactivated upon removal of the user input, allowing one of the application icons to be selected with a second user input.

The foregoing description of implementations provides illustration and description, but is not intended to be exhaustive or to limit the invention to the precise form disclosed. Modifications and variations are possible in light of the above teachings or may be acquired from practice of the invention.

For example, while implementations have been described primarily in the context of a mobile device (such as a radiotelephone, a PCS terminal, or a PDA), in other implementations the systems and/or methods described herein may be implemented on other computing devices such as a laptop computer, a personal computer, a tablet computer, an ultra-mobile personal computer, or a home gaming system.

As another example, while a multi-button menu icon has been generally presented as having a three-by-three arrangement of buttons, other button arrangements may be used. The multi-button icon may include, for example, any N-by-N or N-by-M arrangement where N and M are both a number greater than 1.

Also, while a series of blocks has been described with regard to FIG. 7, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method comprising:
    displaying, on a screen of the computing device and prior to user activation of a menu icon, the menu icon and a first group of application icons,
        the menu icon including a plurality of buttons, each of the plurality of buttons being associated with a different group of application icons;
    receiving a user input to activate the menu icon;
    identifying, based on the received user input to activate the menu icon, a selection of a first button of the menu icon associated with a location of the user input;
    enlarging, based on the selection, the menu icon and each of the plurality of buttons,
        the selected first button being enlarged to a size larger than each of the other plurality of buttons;
    enlarging the display of the menu icon to overlap at least one of the application icons in the first group of application icons;
    displaying, on the screen of the computing device, a second group of application icons associated with the selected first button of the menu icon,
        the second group of application icons being different than the first group of application icons;
    identifying a selection of a second button of the menu icon associated with a changed location of the user input; and
    displaying, on the screen of the computing device, a third group of application icons associated with the selected second button of the menu icon,
        the third group of application icons being different than the first group of application icons, being different than the second group of application icons, and being independent of the second group of application icons.

2. The computing device-implemented method of claim 1, further comprising:
    deactivating the menu icon upon detecting a removal of the user input; and
    detecting a second user input to select one of the application icons from the third group of application icons associated with the identified second button of the menu icon.

3. The computing device-implemented method of claim 1, where the menu icon further comprises an indicator to display the identified second button of the menu icon.

4. The computing device-implemented method of claim 1, where the user input to activate the menu icon is a touch on a touch sensitive display.

5. The computing device-implemented method of claim 1, where the user input to activate the menu icon includes one of:
    selecting the menu icon using a cursor, or
    activating the menu icon using a button on the computing device.

6. The computing device-implemented method of claim 1, where the menu icon includes an indicator to identify a button on the menu icon that is currently selected.

7. The computing device-implemented method of claim 1, where the application icons are associated with one or more applications including:
    a telephone application,
    a text-messaging application,
    an email application,
    an instant messaging (IM) application,
    a calendar application,
    a multimedia messaging system (MMS) application,
    a short message service (SMS) application,
    an image viewing application,
    a camera application,
    an organizer,
    a video player,
    an audio application, or
    a Global Positioning System (GPS) application.

8. The computing device-implemented method of claim 1, where the menu icon includes a three-by-three arrangement of buttons.

9. The computing device-implemented method of claim 1, where the computing device comprises:
    a radiotelephone,
    a personal communications system (PCS) terminal, or
    a personal digital assistant (PDA).

10. The computing device-implemented method of claim 1, where the computing device comprises:
    a laptop computer,
    a personal computer,
    a tablet computer,
    an ultra-mobile personal computer,
    a personal gaming system, or
    a Global Positioning System (GPS) unit.

11. A device comprising:
    a memory to store a plurality of instructions; and
    a touch-sensitive display; and
    a processor to execute instructions in the memory to:
        display, on the touch-sensitive display and prior to user activation of a menu icon, the menu icon and a first group of application icons,
            the menu icon including a plurality of buttons, each of the plurality of buttons being associated with a different group of application icons;
        receive a touch on the menu icon displayed on the touch-sensitive display;
        activate the menu icon based on the touch;
        track a changing location of the touch;
        identify a selection of a button of the menu icon based on the changing location of the touch;
        enlarge, based on the selection, the menu icon and each of the plurality of buttons,
            the selected button being enlarged to a size larger than each of the other plurality of buttons;
        enlarge the display of the menu icon to overlap at least one of the application icons in the first group of application icons; and
        display, on the touch-sensitive display, a second group of application icons associated with the selected button of the menu icon, the second group of application icons being different than the first group of application icons and being independent of the first group of application icons.

12. The device of claim 11, where the processor further executes instructions in the memory to:
    deactivate the menu icon upon removal of the touch; and
    detect a touch on one of the application icons from the second group of application icons associated with the selected button of the menu icon.

13. The device of claim 12, where the touch on one of the application icons triggers one of:
   launching an application associated with the one of the application icons, or
   presenting information associated with the one of the application icons.

14. The device of claim 11, where the device comprises:
   a radiotelephone,
   a personal communications system (PCS) terminal,
   a personal digital assistant (PDA),
   a laptop computer,
   a personal computer,
   a tablet computer,
   an ultra-mobile personal computer,
   a camera,
   a gaming system, or
   a Global Positioning System (GPS) unit.

15. The device of claim 11, where the menu icon includes a N-by-N arrangement of buttons, where N is greater than 1.

16. The device of claim 11, where the menu icon further comprises an indicator to display the group of application icons associated with a last-identified button of the menu icon.

17. The device of claim 11, where the processor further executes instructions in the memory to:
   receive a user input to identify one or more application icons assigned to the second group of application icons associated with the selected button of the menu icon.

18. The device of claim 11, where a location, on the touch-sensitive display, of the menu icon and the second group of application icons is determined by a user.

19. A non-transitory computer-readable medium storing instructions, the instructions comprising:
   one or more instructions which, when executed by at least one processor, cause the at least one processor to:
      display, prior to user activation of a menu icon, the menu icon and a first group of application icons on a screen of a device,
         the menu icon including a plurality of buttons,
         each of the plurality of buttons being associated with a different group of application icons, and
         the first group of application icons being different than each of the different groups of application icons;
      receive a user input to activate the menu icon;
      identify, based on the received user input to activate the menu icon, a selection of a button of the menu icon based on a location of the user input;
      enlarge, based on the selection, the menu icon and each of the plurality of buttons,
         the selected button being enlarged to a size larger than each of the other plurality of buttons;
      enlarge the display of the menu icon to overlap at least one of the application icons in the first group of application icons;
      display, on the screen of the device, a second group of application icons, of the different group of application icons, associated with the selected button of the menu icon;
      track a changing location of the user input;
      identify another button of the menu icon based on the changing location of the user input;
      display a third group of application icons, of the different group of application icons, associated with the identified other button of the menu icon,
         the third group of application icons being different than the first group of application icons, being different than the second group of application icons, and being independent of the second group of application icons; and
      detect another user input to select one of the application icons from the group of application icons associated with the identified second button of the menu icon.

20. The medium of claim 19, where the one or more instructions are further to:
   deactivate the menu icon upon removal of the user input.

21. The medium of claim 19, where the menu icon further comprises:
   an indicator to display the identified second button of the menu icon, and
   an indicator to identify a button on the menu icon that is currently selected.

22. The medium of claim 19, where the menu icon includes a N-by-N arrangement of buttons, where N is greater than 1.

* * * * *